(12) United States Patent
Osawa et al.

(10) Patent No.: US 9,339,881 B2
(45) Date of Patent: May 17, 2016

(54) REMOVABLE TIP TYPE ROTARY TOOL

(75) Inventors: Jiro Osawa, Toyokawa (JP); Tasuku Itoh, Toyokawa (JP); Takayuki Matsushita, Toyokawa (JP); Kentarou Norimatsu, Toyokawa (JP)

(73) Assignee: OSG CORPORATION, Toyokawa-shi (JP)

(*) Notice: Subject to any disclaimer, the term of this patent is extended or adjusted under 35 U.S.C. 154(b) by 245 days.

(21) Appl. No.: 14/123,639

(22) PCT Filed: Jun. 8, 2011

(86) PCT No.: PCT/JP2011/063184
§ 371 (c)(1),
(2), (4) Date: Dec. 3, 2013

(87) PCT Pub. No.: WO2012/169031
PCT Pub. Date: Dec. 13, 2012

(65) Prior Publication Data
US 2014/0105697 A1    Apr. 17, 2014

(51) Int. Cl.
*B23G 5/06* (2006.01)
*B23G 5/00* (2006.01)
(Continued)

(52) U.S. Cl.
CPC .............. *B23G 5/005* (2013.01); *B23B 31/005* (2013.01); *B23G 5/06* (2013.01); *B23G 7/02* (2013.01); *B23B 2231/0204* (2013.01); *B23B 2231/026* (2013.01); *B23B 2231/028* (2013.01);
(Continued)

(58) Field of Classification Search
CPC ...... B23G 5/005; B23G 5/06; B23G 2200/06; B23B 2231/0204; B23B 2240/24; B23B 2260/124; Y10T 408/45; Y10T 408/455; Y10T 408/95; Y10T 408/957

USPC ................................ 408/57, 59, 239 R, 239 A
See application file for complete search history.

(56) References Cited

U.S. PATENT DOCUMENTS

| | | | |
|---|---|---|---|
| 5,993,120 A | 11/1999 | Giessler | |
| 7,150,590 B2 * | 12/2006 | Schafer | B23B 27/007 407/40 |
| 2003/0049081 A1 | 3/2003 | Chapel et al. | |

FOREIGN PATENT DOCUMENTS

| | | |
|---|---|---|
| CN | 201089049 Y | 7/2008 |
| JP | A-2005-254427 | 9/2005 |

(Continued)

OTHER PUBLICATIONS

US Translation of JP 2006123122 A, May 2006.*
Nov. 4, 2014 Office Action issued in JP Application No. 2013-519278.
International Search Report issued in International Patent Application No. PCT/JP2011/063184 mailed Aug. 16, 2011.
Apr. 20, 2015 Office Action issued in Chinese Patent Application No. 201180071461.2.

* cited by examiner

*Primary Examiner* — Sunil K Singh
*Assistant Examiner* — Alan Snyder
(74) *Attorney, Agent, or Firm* — Oliff PLC

(57) ABSTRACT

A removable tip type rotary tool is provided in which a rotation stop key and a key groove each having a triangular shape are disposed on opposing surfaces of a body and a tip concentrically attached to a leading end portion of the body in a removable manner. A pair of side surfaces of the rotation stop key and a pair of side walls of the key groove are brought into surface contact by mounting screw. An angle for each of the pair of side surfaces and the pair of side walls is between 60 to 100 degrees, a groove bottom of the key groove is rounded with a radius from 1.5 to 2.8 mm, corners of opening edges on both sides of the key groove and corners of both base-end side portions of the rotation stop key are rounded with radiuses, respectively, from 1.5 to 2.8 mm.

4 Claims, 12 Drawing Sheets

(51) Int. Cl.
  *B23G 7/02* (2006.01)
  *B23B 31/00* (2006.01)

(52) U.S. Cl.
  CPC ....... *B23B2250/12* (2013.01); *B23B 2260/124* (2013.01); *B23C 2240/245* (2013.01); *B23C 2250/12* (2013.01); *B23G 2200/06* (2013.01); *Y10T 408/45* (2015.01)

(56) References Cited

FOREIGN PATENT DOCUMENTS

| | | |
|---|---|---|
| JP | A-2006-123120 | 5/2006 |
| JP | A-2006-123122 | 5/2006 |
| JP | A-2006-181647 | 7/2006 |
| WO | WO 98/46388 A1 | 10/1998 |

FIG.3

| TEST SAMPLES | α (°) | RA(mm) | RB(mm) | L(mm) |
|---|---|---|---|---|
| PROTOTYPE 1 | 0(WIDTH=2.5) | 0.5 | 0.5 | 2.5 |
| PROTOTYPE 2 | 30 | 1 | 2 | 2.5 |
| PROTOTYPE 3 | 55 | 2 | 2 | 2.5 |
| PROTOTYPE 4 | 60 | 2 | 2 | 2.5 |
| PROTOTYPE 5 | 90 | 2 | 2 | 2.5 |
| PROTOTYPE 6 | 100 | 2 | 2 | 2.5 |
| PROTOTYPE 7 | 115 | 2 | 2 | 2.5 |
| PROTOTYPE 8 | 90 | 1 | 2 | 2.5 |
| PROTOTYPE 9 | 90 | 2.8 | 2 | 2.5 |
| PROTOTYPE 10 | 90 | 1.2 | 2 | 2.5 |
| PROTOTYPE 11 | 90 | 3 | 2 | 2.5 |
| PROTOTYPE 12 | 90 | 1.5 | 2 | 2.5 |
| PROTOTYPE 13 | 90 | 2 | 1 | 2.5 |
| PROTOTYPE 14 | 90 | 2 | 1.5 | 2.5 |
| PROTOTYPE 15 | 90 | 2 | 2.5 | 2.5 |
| PROTOTYPE 16 | 90 | 2 | 2.8 | 2.5 |
| PROTOTYPE 17 | 90 | 2 | 3 | 2.5 |
| PROTOTYPE 18 | 90 | 2 | 2 | 1.5 |
| PROTOTYPE 19 | 90 | 2 | 2 | 2 |
| PROTOTYPE 20 | 90 | 2 | 2 | 3 |
| PROTOTYPE 21 | 90 | 2 | 2 | 4 |
| PROTOTYPE 22 | 90 | 2 | 2 | 5 |

FIG.4

| TEST SAMPLES | SAFETY RATE | BREAKAGE TORQUE | DAMAGED PORTION |
|---|---|---|---|
| CONVENTIONAL PRODUCT | 2.01 | 70.5 | TIP DAMAGE |
| PROTOTYPE 1 | 1.21 | 42.5 | TIP DAMAGE |
| PROTOTYPE 2 | 1.48 | 51.9 | TIP DAMAGE |
| PROTOTYPE 3 | 1.78 | 62.5 | TIP DAMAGE |
| PROTOTYPE 4 | 2.64 | 92.5 | TIP DAMAGE |
| PROTOTYPE 5 | 3.15 | 110.6 | TIP DAMAGE |
| PROTOTYPE 6 | 2.94 | 103.2 | SCREW DAMAGE |
| PROTOTYPE 7 | 1.05 | 36.9 | SCREW DAMAGE |
| PROTOTYPE 8 | 1.54 | 54.1 | BODY DAMAGE |
| PROTOTYPE 9 | 2.36 | 82.8 | BODY DAMAGE |
| PROTOTYPE 10 | 1.68 | 58.9 | BODY DAMAGE |
| PROTOTYPE 11 | 1.92 | 67.4 | BODY DAMAGE |
| PROTOTYPE 12 | 2.77 | 97.2 | BODY DAMAGE |
| PROTOTYPE 13 | 1.94 | 68.2 | TIP DAMAGE |
| PROTOTYPE 14 | 2.46 | 86.4 | TIP DAMAGE |
| PROTOTYPE 15 | 2.64 | 92.6 | BODY DAMAGE |
| PROTOTYPE 16 | 2.35 | 82.5 | BODY DAMAGE |
| PROTOTYPE 17 | 1.82 | 64 | BODY DAMAGE |
| PROTOTYPE 18 | 0.69 | 24.3 | TIP DAMAGE |
| PROTOTYPE 19 | 2.60 | 91.2 | TIP DAMAGE |
| PROTOTYPE 20 | 3.00 | 105.4 | TIP DAMAGE |
| PROTOTYPE 21 | 2.96 | 103.8 | BODY DAMAGE |
| PROTOTYPE 22 | 2.80 | 98.2 | BODY DAMAGE |

FIG.5(a)
TEST SAMPLES

| CONVENTIONAL PRODUCT | CONVENTIONAL TYPE (Y-SHAPED OIL PASSAGE) |
|---|---|
| PROTOTYPE 1 | SHANK-THROUGH |
| PROTOTYPE 2 | OIL SUPPLY ONLY FROM HEAD PORTION |
| PROTOTYPE 3 | OIL SUPPLY FROM HEAD PORTION + NECK PORTION |

FIG.5(b)
TEST CONDITIONS

| NOMINAL SIZE | M14 × 1.5 | HARDNESS OF FORM-ROLLED MATERIAL | 30HRC |
|---|---|---|---|
| PREPARED HOLE | φ13.3(THROUGH HOLE) | NUMBER OF ROTATIONS | 560 (min$^{-1}$) |
| FORM-ROLLED MATERIAL | SCM440 | OIL AGENT | WATER-SOLUBLE |

FIG.5(c)
TEST RESULT

| TEST SAMPLES | NUMBER OF FORM-ROLLED HOLES | CAUSE OF LIFE EXPIRATION | TEST SAMPLES | NUMBER OF FORM-ROLLED HOLES | CAUSE OF LIFE EXPIRATION |
|---|---|---|---|---|---|
| CONVENTIONAL PRODUCT-1 | 6714 | CHIPPING | PROTOTYPE 2-1 | 6720 | WEARING |
| CONVENTIONAL PRODUCT-2 | 1270 | CHIPPING | PROTOTYPE 2-2 | 5812 | CHIPPING |
| CONVENTIONAL PRODUCT-3 | 5738 | CHIPPING | PROTOTYPE 2-3 | 4819 | CHIPPING |
| PROTOTYPE 1-1 | 3780 | CHIPPING | PROTOTYPE 3-1 | 6800 | WEARING |
| PROTOTYPE 1-2 | 1212 | CHIPPING | PROTOTYPE 3-2 | 6800 | WEARING |
| PROTOTYPE 1-3 | 507 | CHIPPING | PROTOTYPE 3-3 | 6800 | WEARING |

FIG.5(d)
GRAPH OF NUMBER OF ROLL-FORMED HOLES

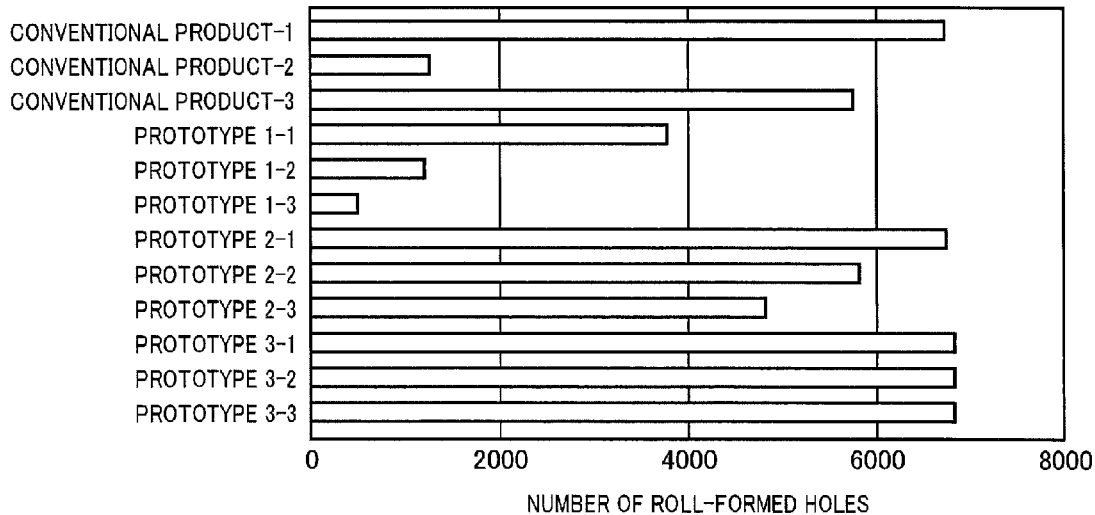

REMOVABLE TIP TYPE ROTARY TOOL

TECHNICAL FIELD

The present invention relates to a removable tip type rotary tool and particularly to an improvement of the removable tip type rotary tool having a mounting screw penetrating a tip and screwed into a screw hole of a body so as to integrally fix the tip concentrically with a shaft center O of the body.

BACKGROUND ART

A removable tip type rotary tool is known that has (a) a body forming a shaft shape and having a screw hole disposed concentrically with a shaft center O and a fluid supply path disposed in communication with the screw hole, (b) a tip concentrically attached to a leading end portion of the body in a removable manner, rotationally driven around the shaft center O along with the body for predetermined processing, and disposed with a mounting hole penetrating through the shaft center of the tip, and (c) a mounting screw penetrating the mounting hole of the tip and screwed into the screw hole of the body to integrally fix the tip to the body. A removable tip type tap described in Patent Document 1 is an example thereof and fluid is guided to the leading end side of the tip via a fluid introduction path disposed on the shaft center of the mounting screw and is discharged outside.

Although a removable tip type thread forming tap 150 of FIG. 11 has a tip 156 attached in a removable manner via a mounting screw 154 to a body 152 in the same way, a fluid supply path 158 is branched into a Y shape before reaching a screw hole such that fluid is supplied to the tip 156 from the outside. The opposing surfaces of the body 152 and the tip 156 axially opposed to each other have multiplicities of meshing teeth 160 and tooth grooves 162, respectively, disposed alternately and radially as depicted in (b) and meshed with each other so that the surfaces are integrally fixed in a relatively non-rotatable manner.

PRIOR ART DOCUMENT

Patent Document

Patent Document 1: Japanese Laid-Open Patent Publication No. 2005-254427

SUMMARY OF THE INVENTION

Problems to be Solved by the Invention

However, since the replaceable tip type rotary tool described in Patent Document 1 has a tip attached to a body by a fastening power from a mounting screw, if a rotational resistance is generated by fastening due to elasticity of a work when the tip is extracted from a female thread, for example, as in the case of a thread forming tap, the mounting screw may be loosened. Since fluid is simply discharged axially from a leading end of the tip, the fluid cannot sufficiently be supplied to a portion machined by the tip, for example, in the case of the tap machining a female thread to a through-hole. The replaceable tip type rotary tool of FIG. 11 can fix the tip at a constant phase in a relatively non-rotatable manner with meshing of multiplicity of meshing teeth; however, complicated shapes require troublesome machining and increase manufacturing cost. Although the fluid can be supplied to the portion machined by the tip, since the fluid is obliquely discharged from a position away from the tip, sufficient fluid supply performance is not necessarily acquired because the fluid is dispersed by centrifugal force etc., and, for example, the tip may be welded to a work at the time of backing when the tip is extracted from a female thread, resulting in breakage of a coupling portion between the body and tip.

The present invention was conceived in view of the situations and it is therefore an object of the present invention to provide a removable tip type rotary tool having a mounting screw penetrating a tip and screwed into a screw hole of a body so as to integrally fix the tip concentrically with a shaft center O of the body such that the tip is firmly fixed to the body at a constant phase with a simple structure and that fluid is more properly supplied to a machined portion to further improve the breakage strength.

Means for Solving the Problem

To achieve the object, the first aspect of the invention provides a removable tip type rotary tool comprising: (a) a body forming a shaft shape, the body having a screw hole disposed concentrically with a shaft center O and a fluid supply path disposed in communication with the screw hole; (b) a tip concentrically attached to a leading end portion of the body in a removable manner, the tip being rotationally driven around the shaft center O along with the body for predetermined processing, the tip being disposed with a mounting hole penetrating through the shaft center of the tip; and (c) a mounting screw penetrating the mounting hole of the tip and screwed into the screw hole of the body to integrally fix the tip to the body, wherein (d) one and the other of opposing surfaces of the body and the tip are disposed with a rotation stop key and a key groove each having a triangular shape with a cross section symmetric relative to the shaft center O in the direction orthogonal to the shaft center O, wherein fastening by the mounting screw brings a pair of side surfaces of the rotation stop key and a pair of side walls of the key groove into close surface contact with each other, wherein (e) a total angle α for each of the pair of the side surfaces of the rotation stop key and the pair of the side walls of the key groove is within a range from 60 degrees to 100 degrees, wherein a groove bottom of the key groove is rounded with a radius RA within a range from 1.5 mm to 2.8 mm, wherein corners of opening edges on both sides of the key groove and corners of both base-end side portions of the rotation stop key are rounded with radiuses RB and RC, respectively, within a range from 1.5 mm to 2.8 mm, wherein (f) the removable tip type rotary tool is disposed with a fluid introduction path guiding fluid supplied from the fluid supply path into the screw hole toward the tip, and wherein the removable tip type rotary tool has a leading end side discharge passage discharging the fluid to an outer circumferential side from a leading end side relative to a center of the tip in axial direction and a base end side discharge passage discharging the fluid to the outer circumferential side from a base end side relative to the center.

The second aspect of the invention provides the removable tip type rotary tool recited in the first aspect of the invention, wherein the rotation stop key is disposed on the opposing surface of the tip, wherein the rotation stop key has a leading end disposed with a retraction surface away from a bottom portion of the key groove, and wherein a gap between the retraction surface and the key groove acts as the base end side discharge passage.

The third aspect of the invention provides the removable tip type rotary tool recited in the second aspect of the invention, wherein a gap dimension d between the retraction surface and the bottom portion of the key groove is within a range from 0.2 mm to 0.5 mm.

The fourth aspect of the invention provides the removable tip type rotary tool recited in any one of the first to third aspects of the invention, wherein a housing hole housing a head portion of the mounting screw is disposed in a leading end surface of the tip, wherein a radial groove is disposed continuously from an opening portion of the housing hole to an outer circumferential edge, wherein an axial passage is disposed between an inner wall surface of the housing hole and an outer circumferential surface of the head portion in communication with the radial groove, and wherein the axial passage and the radial groove act as the leading end side discharge passage.

The fifth aspect of the invention provides the removable tip type rotary tool recited in the first or fourth aspect of the invention, wherein the tip is a tap machining a female thread and has a screw thread disposed on an outer circumferential surface, wherein a radial hole penetrating from the mounting hole to the outside is disposed on the base end side relative to a center of the tip in axial direction within a range of two pitches or less of the screw thread from the base end side of the tip, and wherein the radial hole acts as the base end side discharge passage.

The sixth aspect of the invention provides the removable tip type rotary tool recited in any one of the first to fifth aspects of the invention, wherein both the rotation stop key and the key groove are formed into a predetermined cross-sectional shape by wire cut discharge machining.

Effects of the Invention

In the removable tip type rotary tool as described above, the rotation stop key and the key groove having triangular cross sections are brought into close surface contact with each other, thereby integrally attaching the tip to the body at a constant phase around the shaft center O; the common total angle α of a pair of the side surfaces of the rotation stop key and a pair of the side walls of the key groove is within a range from 60 degrees to 100 degrees; the groove bottom of the key groove is rounded with the radius RA within a range from 1.5 mm to 2.8 mm; and the corners of the opening edges on the both sides of the key groove and the corners of the both base-end side portions of the rotation stop key are rounded with the respective radiuses RB and RC within a range from 1.5 mm to 2.8 mm; and, therefore, chipping and damaging due to stress concentration are suppressed and higher mounting strength (breakage strength at the time of rotary machining) is acquired. Since it is only required to dispose the rotation stop key and the key groove having triangular cross sections on the respective opposing surfaces of the body and the tip, the structure is simplified and the manufacturing cost is reduced.

On the other hand, the fluid introduction path is disposed such that the fluid supplied from the fluid supply path into the screw hole is guided to the tip, and the fluid is discharged to the outer circumferential side from both the leading end side discharge passage and the base end side discharge passage. Therefore, the fluid is sufficiently supplied to a portion of the processing by the tip and the breakage strength is further improved in combination with the rotation stop structure of the rotation stop key and the key groove. Since the fluid is discharged not only on the leading end side but also on the base end side of the tip, good lubrication performance is acquired, for example, even at the time of backing when the tip is reversely rotated and extracted by the tap etc. and the welding to the work is suppressed such that the breakage is more properly suppressed.

The second aspect of the invention represents the case that the rotation stop key is disposed on the opposing surface of the tip and, since the leading end of the rotation stop key is disposed with the retraction surface away from the bottom portion of the key groove and the gap between the retraction surface and the key groove acts as the base end side discharge passage, this aspect of the invention is advantageous in terms of strength and the manufacturing cost is further reduced as compared to the case of disposing a radial through-hole in the tip.

In the third aspect of the invention, since the gap dimension d between the retraction surface and the bottom portion of the key groove is within a range from 0.2 mm to 0.5 mm, the gap can be used as the base end side discharge passage while the mounting strength is ensured by the fitting of the rotation stop key and the key groove.

In the fourth aspect of the invention, a housing hole housing a head portion of the mounting screw is disposed in a leading end surface of the tip, wherein a radial groove is disposed continuously from an opening portion of the housing hole to an outer circumferential edge, wherein an axial passage is disposed between an inner wall surface of the housing hole and an outer circumferential surface of the head portion in communication with the radial groove, and wherein the axial passage and the radial groove act as the leading end side discharge passage and, therefore, this aspect of the invention is advantageous in terms of strength and the fluid can properly be supplied to the leading end portion of the tip as compared to the case of disposing a radial through-hole in the tip.

The fifth aspect of the invention represents the case that the tip is a tap machining a female thread and has a screw thread disposed on an outer circumferential surface and, since a radial hole is disposed within a range of two pitches or less from the base end side of the tip, and wherein the radial hole acts as the base end side discharge passage, the fluid is further properly supplied to the base end side portion of the tip. As a result, good lubrication performance is acquired even at the time of backing when the tip is reversely rotated and extracted from a female thread after machining of the female thread, and the welding to the work is suppressed and the breakage is further properly suppressed.

The sixth aspect of the invention represents the case that the rotation stop key and the key groove are formed by the wire cut discharge machining and, the rotation stop key and the key groove can be machined with high dimension accuracy into a predetermined cross-sectional shape recited in the first aspect of the invention and the mounting strength from the fitting thereof can properly be ensured.

BRIEF DESCRIPTION OF THE DRAWINGS

FIG. 3 is a diagram for explaining specifications of prototypes prepared to examine a breakage torque.

FIG. 4 is a diagram for explaining a result of examining the breakage torque by using a prototype of FIG. 3 and a conventional product of FIG. 11.

FIG. 5 is a diagram for explaining the test conditions and the test results when executing a female thread rolling process by using a plurality of conventional products and prototypes and conducting an endurance test.

MODE FOR CARRYING OUT THE INVENTION

Figure 1A:
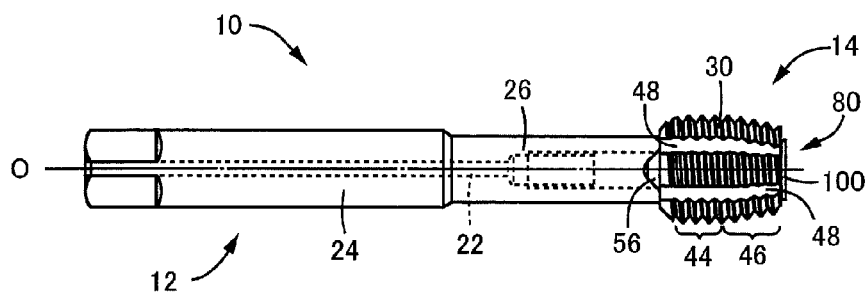
FIG. 1 is a diagram of a removable tip type thread forming tap that is an example of the present invention; (a) is a front view from the direction orthogonal to the shaft center O; (b) is an enlarged cross-sectional view of a leading end portion including a tip; and (c) is an end surface view from the leading end side.

A removable tip type rotary tool of the present invention is preferably applied to a thread forming tap for a female thread forming process and is also applicable to various rotary tools such as a cut tap, a spot facing cutter, a spot drill, a chamfering cutter, and a T-slot cutter. Although high-speed tool steel is preferably used for a body and cemented carbide is preferably used for a tip, other tool materials and hard materials are also employable. Although an oil agent for cooling and lubrication is preferably used for fluid supplied from a fluid supply path into a screw hole and discharged to a portion machined by the tip, a gas such as cooling air can also be supplied. The oil agent can be supplied in a liquid state or can be supplied in a mist state.

The tip is positioned at a constant phase around a shaft center O by fitting of a rotation stop key and a key groove and, therefore, a mounting screw and a screw hole may have a right-hand thread or a left-hand thread; however, for example, in the case of a removable tip type rotary tool rotationally driven to one direction around the shaft center O for machining, the mounting screw and the screw hole can be configured to be automatically tightened by a rotation resistance at the time of the machining. For example, if the tool is rotationally driven clockwise for the machining when viewed from the body side, the mounting screw and the screw hole may be given a right-hand thread.

Although the fluid supply path disposed in the body is disposed straight in the shaft center of the body, for example, and is opened at a rear end surface and coupled to a supply pipe etc., various forms are available since one or more paths can be disposed at a position deviated from the shaft center or a radial hole may be disposed to intersect with the shaft center and may be opened in a side surface of a shank.

The rotation stop key and the key groove may be disposed on one and the other of the body and the tip such that the rotation stop key is disposed on the body while the key groove is disposed on the tip or such that the rotation stop key is disposed on the tip while the key groove is disposed on the body. With regard to a total angle α for each of a pair of side surfaces of the rotation stop key and a pair of side walls of the key groove, if the angle is smaller than 60 degrees, a large load is applied and tends to cause damage to a fitting portion while if the angle exceeds 100 degrees, a large load is applied and tends to cause damage to the mounting screw and, therefore, a range from 60 degrees to 100 degrees is appropriate. With regard to a radius RA of roundness of a groove bottom of the key groove, if the radius is smaller than 1.5 mm, stress is concentrated and tends to cause damage to the groove bottom while if the radius is larger than 2.8 mm, a thickness is reduced on the both sides of the key groove and tends to cause damage and, therefore, a range from 1.5 mm to 2.8 mm is appropriate. With regard to either of a radius RB of roundness of corners of opening edges on the both sides of the key groove and a radius RC of roundness of corners of both base-end side portions of the rotation stop key, if the radius is smaller than 1.5 mm, stress is concentrated and tends to cause damage to the corners of the rotation stop key while if the radius is larger than 2.8 mm, a torque transmission area (area of a contact portion between a side surface of the rotation stop key and a side wall of the key groove) is reduced and tends to cause damage and, therefore, a range from 1.5 mm to 2.8 mm is appropriate.

The fluid introduction path can have various forms such as an axial hole disposed on the shaft center of the mounting screw, an axial groove disposed on the side surface of the mounting screw in parallel with the shaft center, or a flat chamfer parallel to the shaft center, for example. An axial groove can be disposed on a screw hole into which the mounting screw is screwed or inserted or a mounting hole of the tip. Although a leading end side discharge passage is configured such that fluid is guided along a head portion of the mounting screw to the leading end of the tip and discharged to the outer circumferential side, for example, as described in the fourth aspect of the invention, a radial hole may be disposed that penetrates from the mounting hole of the tip to the outside or a Y-shaped branch hole may be disposed in the head portion of the mounting screw such that fluid is discharged obliquely outward to the tip leading end side. Although a base end side discharge passage is made up of a gap between a retraction surface disposed on the leading end of the rotation stop key and the key groove, for example, as described in the second aspect of the invention, a radial hole may be disposed that penetrates from the mounting hole of the tip to the outside. Although the discharge direction of fluid from these discharge passages may be any direction as long as the fluid is at least discharged to the outer circumferential side and may be the radial direction orthogonal to the shaft center O, the direction may be inclined forward or backward in the shaft center O direction or may be inclined circumferentially around the shaft center O. The head portion of the mounting screw may have a columnar shape with a constant radial dimension or may have a taper shape having a radius reduced toward the screw shaft side. The retraction surface disposed on the rotation stop key may be a flat surface orthogonal to the shaft center O, a cylindrical surface having a radius larger than the radius RA of the groove bottom of the key groove, etc.

If a gap between the retraction surface and the bottom portion of the key groove is used as the base end side discharge passage, since a gap dimension d smaller than 0.2 mm leads to insufficient fluid discharge performance and a gap dimension greater than 0.5 mm impairs the mounting strength of the fitting of the rotation stop key and the key groove, a range from 0.2 mm to 0.5 mm is appropriate.

Although the rotation stop key and the key groove are formed by the wire cut discharge machining in the sixth aspect of the invention, the machining method is determined as needed depending on material of the body and the tip and, in the case of the tip made of cemented carbide, the rotation stop key and the key groove may be formed by molding using a mold. In the case of the body made of high-speed tool steel, the rotation stop key and the key groove may be formed by cutting or grinding.

First Example

An example of the present invention will now be described in detail with reference to the drawings.

Figure 1B:
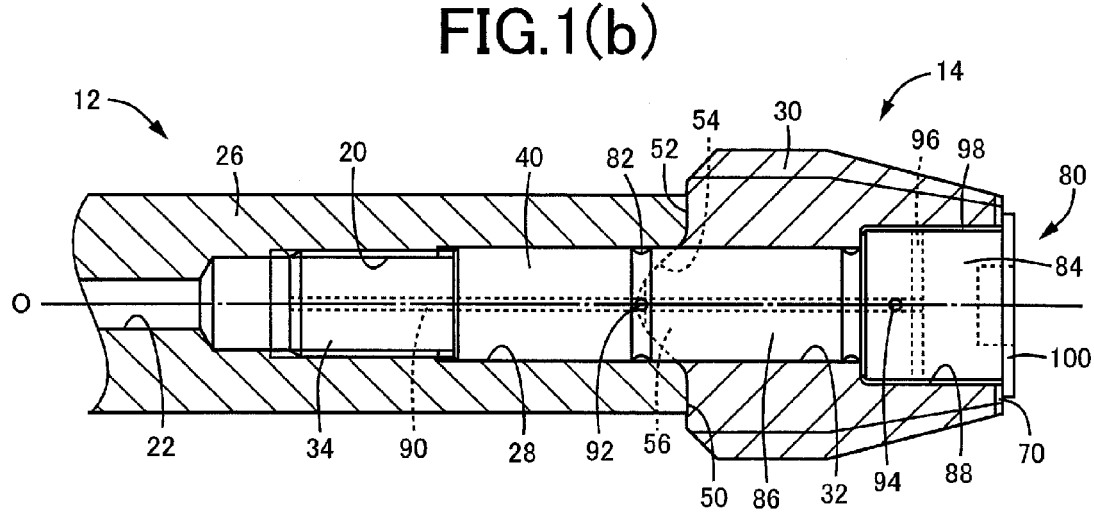

FIG. 1 is a diagram of a removable tip type thread forming tap (hereinafter simply referred to as a thread forming tap) 10 that is an example of the present invention; (a) is a front view from the direction orthogonal to the shaft center O; (b) is an enlarged cross-sectional view of a leading end portion including a tip 14; and (c) is an end surface view from the leading end side of the tip 14. FIG. 2 is an enlarged view of a coupling structure of the tip 14 and the body 12 of the thread forming tap 10; (a) is a front view corresponding to FIG. 1(a); and (b) is a cross-sectional view taken along a line IIB-IIB of (a).

The thread forming tap 10 is formed by attaching the tip 14 to the leading end of the shaft-shaped body 12 in a removable manner with a mounting screw 80 concentrically with the shaft center O of the body 12, has a stepped hole formed on the shaft center O of the body 12 from the leading end side with a female thread 20 disposed on a small diameter portion thereof, and is disposed with a fluid supply path (in this example, a small diameter hole) 22 from the rear end in communication with the stepped hole. A portion disposed with the female thread 20 of the stepped hole corresponds to a screw hole. The body 12 is made of high-speed tool steel and forms a stepped columnar shape, and a large diameter portion on the rear side is a shank 24 while a small diameter portion on the leading end side is a neck portion 26 having a diameter smaller than the tip 14. A centering hole 28 having a diameter larger than the female thread 20 is disposed closer to an opening portion than the female thread 20 in the stepped hole. The tip 14 is made of cemented carbide, has an outer circumferential portion disposed with a male thread 30 for the female thread forming process, has a mounting hole 32 formed on the shaft center in a penetrating manner, and is integrally fixed to the body 12 by a leading end thread portion 34 of the mounting screw 80 penetrating the mounting hole 32 and screwed into the female thread 20 of the body 12.

The mounting screw 80 has a column-shaped head portion 84, which is housed with a play in a cylindrical-hole-shaped housing hole 88 disposed in the opening portion on the leading end side of the mounting hole 32 of the tip 14. The mounting screw 80 has a pair of centering portions 40 and 86 between the leading end thread portion 34 and the head portion 84 with an annular groove 82 interposed between the centering portions and, the mounting screw 80 and the body 12 are centrically centered by fitting the centering portion 40 into the centering hole 28 of the body 12 while the mounting screw 80 and the tip 14 are centrically centered by fitting the centering portion 86 into the mounting hole 32 of the tip 14. As a result, the body 12 and the tip 14 are concentrically aligned via the mounting screw 80. Since both the centering portions 40 and 86 form a perfect circular column shape, the body 12 and the tip 14 can more accurately be centered as compared to the case of disposing flat chamfers 60 on the outer circumferential surface as in an example of FIG. 8, for example. The mounting hole 32 of the tip 14 also acts as a centering hole.

Figure 1C:
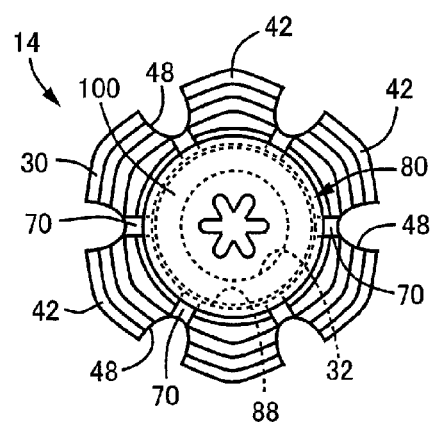
Figure 2A:
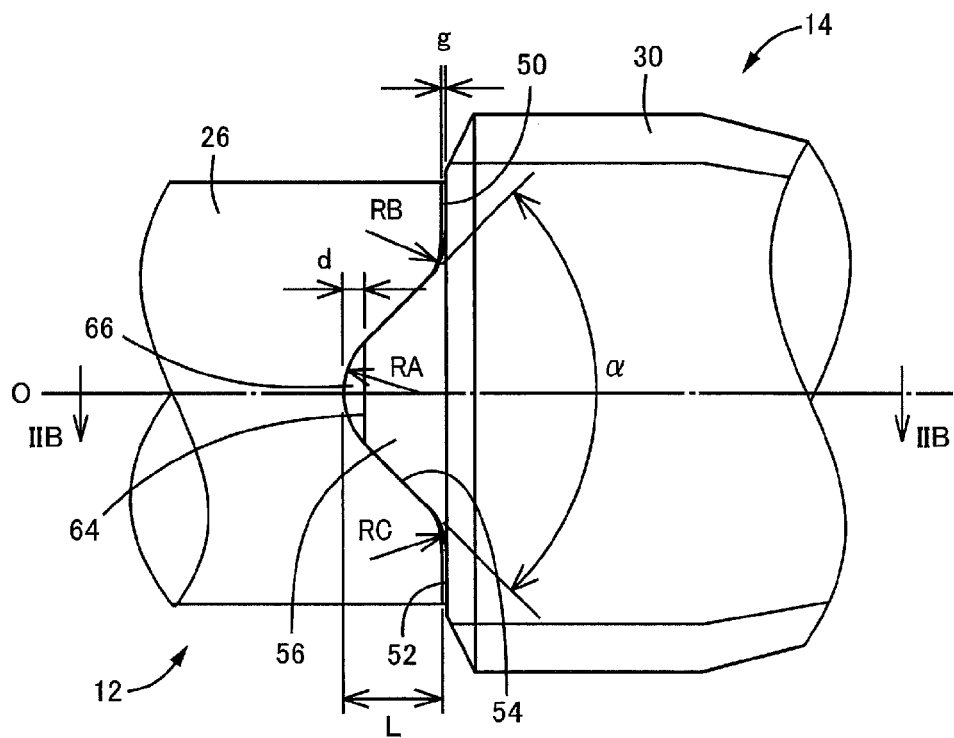
FIG. 2 is a view of a coupling structure of the tip and the body of the thread forming tap in FIG. 1; (a) is a front view corresponding to FIG. 1(a); and (b) is a cross-sectional view taken along a line IIB-IIB of (a).

As is clear from FIG. 1(c), the outer circumferential portion of the tip 14 has a screw thread of the male thread 30 disposed spirally to form a cross section of a regular polygonal shape, i.e., a substantially hexagonal shape in this example, consisting of outwardly curved sides and, when the tip 14 is rotationally driven around the shaft center O integrally with the body 12, six projecting portions 42 corresponding to the vertexes of the hexagonal shape cut into, and plastically deform, a surface portion of a prepared hole of a work, thereby forming the female thread. The male thread 30 includes a perfect thread portion 44 with a substantially constant diameter dimension of the projecting portions 42 and a leading portion 46 with a diameter dimension gradually reduced toward the leading end side. Oil flow grooves 48 are formed in parallel with the shaft center O at circumferential intermediate positions between the six projecting portions 42. In this example, the male thread 30 is a right-hand screw of M14×1.5 and is rotationally driven clockwise during lead feed when viewed from the shank 24 and, as a result, the tip 14 is screwed into a prepared hole of a work for the female thread-forming process.

Opposing surfaces 50 and 52 of the body 12 and the tip 14 are respectively disposed with a key groove 54 and a rotation stop key 56 having a triangular shape with a cross section symmetric relative to the shaft center O in the direction orthogonal to the shaft center O and, when the tip 14 is fastened to the body 12 by the mounting screw 80, a pair of side walls of the key groove 54 and a pair of side surfaces of the rotation stop key 56 are brought into close surface contact with each other and are coupled in a relatively non-rotatable manner and positioned at a constant phase around the shaft center O. The common total angle α for each of a pair of the side walls of the key groove 54 and a pair of the side surfaces of the rotation stop key 56 is within a range from 60 degrees to 100 degrees; the groove bottom of the key groove 54 is rounded with the radius RA within a range from 1.5 mm to 2.8 mm; and corners of opening edges on the both sides of the key groove 54 and corners of the both base-end side portions of the rotation stop key 56 are rounded with the respective radiuses RB and RC within a range from 1.5 mm to 2.8 mm. In this example, the radius RB=RC is satisfied; the total angle α is about 90 degrees; the radius RA is about 2 mm; and the radiuses RB and RC are about 2 mm.

The key groove 54 and the rotation stop key 56 are disposed such that a pair of the side walls of the key groove 54 and a pair of the side surfaces of the rotation stop key 56 are brought into close contact with each other and that a gap g within a range from 0.02 mm to 0.08 mm is formed between the opposing surfaces 50 and 52 in the fitting state in which the key groove 54 and the rotation stop key 56 are in close contact. To ensure a contact area (torque transmission area) between a pair of the side walls of the key groove 54 and a pair of the side surfaces of the rotation stop key 56, a depth dimension L of the key groove 54 is set to 0.14D or more relative to a diameter dimension (outer diameter of the male thread 30) D of the tip 14. In this example, the gap g is about 0.05 mm and the depth dimension L is about 2.5 mm (≈0.18D). The key groove 54 and the rotation stop key 56 as described above can be machined with high dimension accuracy by the wire cut discharge machining.

The shaft center of the mounting screw 80 is disposed with a bottomed-hole-shaped fluid introduction path 90 from the leading end surface on the leading end thread portion 34 side to the middle of the head portion 84 and a lubrication oil agent is supplied from the fluid supply path 22 into the stepped hole disposed with the female thread 20 etc., and is guided through the fluid introduction path 90 to the vicinity of the leading end of the tip 14. At a portion disposed with the annular groove 82, a radial hole 92 is disposed orthogonally to the shaft center to penetrate the portion through the shaft center, and a portion of the lubrication oil agent supplied from the fluid supply path 22 into the fluid introduction path 90 is introduced via the radial hole 92 into the annular groove 82. The annular groove 82 is disposed at an axial position coincident with a portion at which the leading end of the rotation stop key 56 and the groove bottom of the key groove 54 are located in an attached state in which the tip 14 is attached to the body 12 by the mounting screw 80. A retraction surface 64 away from the bottom portion of the key groove 54 is disposed at the leading end of the rotation stop key 56 such that a predetermined gap 66 (see FIG. 2) is formed between the retraction surface 64 and the bottom portion of the key groove 54, and the lubrication oil agent guided to the annular groove 82 is discharged from the gap 66 in two directions orthogonal to the shaft center O and opposite to each other. The retraction surface 64 is a flat surface orthogonal to the shaft center O and a gap dimension d from the bottom portion of the key groove 54 is within a range from 0.2 mm to 0.5 mm and is set to about 0.3 mm in this example. In this example, the base end side discharge passage is made up of the radial hole 92, the annular groove 82, and the gap 66. The rotation stop key 56 can be machined along with the retraction surface 64 by one wire cut discharge machining.

In the head portion 84 of the mounting screw 80, a pair of radial holes 94 and 96 is disposed orthogonally to the shaft center to penetrate the head portion 84 through the shaft center such that a substantially cross shape is formed, and the lubrication oil agent guided through the fluid introduction path 90 to the head portion 84 is allowed to flow out through the radial holes 94 and 96 into a gap 98 between the head portion 84 and the housing hole 88. The gap 98 is formed between the head portion 84 and the housing hole 88 to the extent of allowing the lubrication oil agent to flow therethrough, and the leading end surface of the tip 14 has a plurality of radial grooves 70 radially disposed continuously from the opening portion of the housing hole 88 to the outer circumferential edge so that the lubrication oil agent flowing out from the radial holes 94 and 96 into the gap 98 is discharged from the radial grooves 70 to the outer circumferential side. A plurality of the radial grooves 70 is disposed corresponding to the oil flow grooves 48. The outer surface of the head portion 84 is disposed with a flange 100 projecting into a collar shape toward the outer circumferential side, and the flange 100 limits the flowing out of the lubrication oil agent in the gap 98 in the axial direction so that the lubrication oil agent is discharged in the outer circumferential direction substantially orthogonal to the shaft center O. The flange 100 acts as a discharge direction control plate allowing the lubrication oil agent to flow toward the outer circumferential side and an inner corner of the flange 100 is rounded with a radius of about 0.5 mm, for example. The gap 98 corresponds to an axial passage and the leading end side discharge passage is made up of the gap 98, the radial grooves 70, and the radial holes 94 and 96.

In the removable tip type thread forming tap 10 as described above, the rotation stop key 56 and the key groove 54 having triangular cross sections are brought into close surface contact with each other, thereby integrally attaching the tip 14 to the body 12 at a constant phase around the shaft center O of the body 12; the common total angle α of a pair of the side surfaces of the rotation stop key 56 and a pair of the side walls of the key groove 54 is within a range from 60 degrees to 100 degrees; the groove bottom of the key groove 54 is rounded with the radius RA within a range from 1.5 mm to 2.8 mm; and the corners of the opening edges on the both sides of the key groove 54 and the corners of the both base-end side portions of the rotation stop key 56 are rounded with the respective radiuses RB and RC within a range from 1.5 mm to 2.8 mm; and, therefore, chipping and damaging due to stress concentration are suppressed and higher mounting strength (breakage strength at the time of rotary machining) is acquired. Since it is only required to dispose the key groove 54 and the rotation stop key 56 having triangular cross sections on the respective opposing surfaces 50 and 52 of the body 12 and the tip 14, the structure is simplified and the manufacturing cost is reduced.

On the other hand, the shaft center of the mounting screw 80 is disposed with the fluid introduction path 90 such that the lubrication oil agent supplied from the fluid supply path 22 into the stepped hole disposed with the female thread 20 etc., is introduced to the vicinity of the leading end of the tip 14, and the lubrication oil agent is discharged to the outer circumferential side from both the base end side discharge passage (the radial hole 92, the annular groove 82, and the gap 66) disposed on the base end side of the tip 14 and the leading end side discharge passage (the radial holes 94, 96, the gap 98, and the radial grooves 70) disposed on the leading end side of the tip 14. Therefore, the lubrication oil agent is sufficiently supplied to a portion of the female thread forming process by the tip 14 and the breakage strength is further improved in combination with the rotation stop structure of the rotation stop key 56 and the key groove 54. Since the lubrication oil agent is discharged not only on the leading end side but also on the base end side of the tip 14, good lubrication performance is acquired even at the time of backing when the tip 14 is reversely rotated and extracted from the female thread and the welding is suppressed despite the fastening due to elastic contraction of the machined female thread such that the breakage at the time of backing is more properly suppressed.

This example represents the case that the rotation stop key 56 is disposed on the opposing surface 52 of the tip 14 and, since the leading end of the rotation stop key 56 is disposed with the retraction surface 64 away from the bottom portion of the key groove 54 and the gap 66 between the retraction surface 64 and the key groove 54 is used as the base end side discharge passage, this example is advantageous in terms of strength and the manufacturing cost is further reduced as compared to the case of disposing a radial through-hole in the tip 14. Particularly, since the gap dimension d between the retraction surface 64 and the bottom portion of the key groove 54 is within a range from 0.2 mm to 0.5 mm in this example, the gap 66 can be used as the base end side discharge passage while the mounting strength is ensured by the fitting of the rotation stop key 56 and the key groove 54.

The leading end surface of the tip 14 is disposed with the housing hole 88 housing the head portion 84 of the mounting screw 80 and has a plurality of the radial grooves 70 radially disposed continuously from the opening portion of the housing hole 88 to the outer circumferential edge with the gap 98 formed between the housing hole 88 and the head portion 84 such that the gap 98 and the radial grooves 70 act as the leading end side discharge passage and, therefore, this example is advantageous in terms of strength and the fluid can properly be supplied to the leading end portion of the tip 14 as compared to the case of disposing a radial through-hole in the tip 14.

Since the rotation stop key 56 and the key groove 54 are formed by the wire cut discharge machining in this example, the rotation stop key 56 and the key groove 54 can be machined with high dimension accuracy into a predetermined cross-sectional shape and the mounting strength from the fitting thereof can properly be ensured.

Figure 11A:
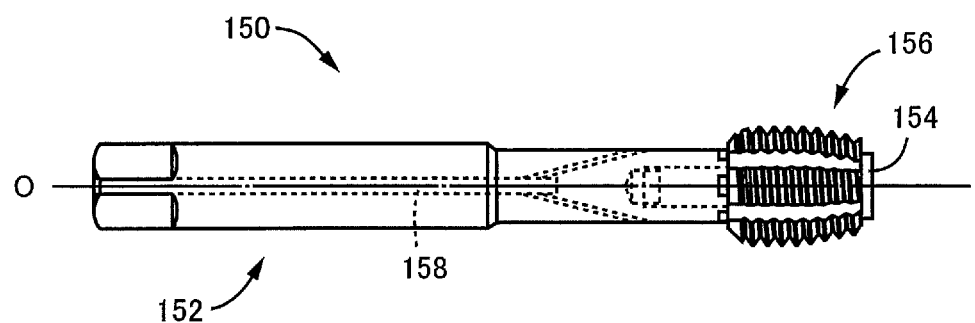
FIG. 11 is a diagram depicting an example of the conventional removable tip type thread forming tap; (a) is a front view from the direction orthogonal to the shaft center O; (b) is a diagram of a meshing teeth disposed on each of the opposing surfaces of the body and the tip.
Figure 11B:
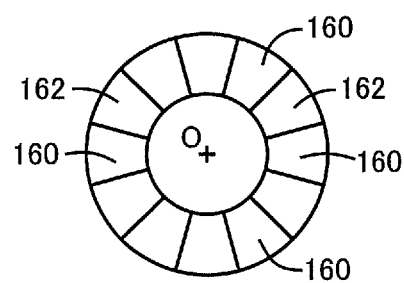

Description will be made of a result of examination of the breakage strength under the following test conditions when a plurality of prototypes 1 to 22 with the total angle α, the radiuses RA, RB (=RC), and the depth dimension L differentiated as depicted in FIG. 3 were prepared along with the conventional product of FIG. 11. The prototypes 1 to 7 are mainly changed in terms of the total angle α; the prototypes 8 to 12 are changed in terms of the radius RA; the prototypes 13 to 17 are changed in terms of the radius RB (=RC); and the prototypes 18 to 22 are changed in terms of the depth dimension L. The prototype 1 with the total angle α=0 degree means the rotation stop key and the key groove having a rectangular cross section with a width dimension of 2.5 mm.

<Test Conditions>

Nominal Size: M14×1.5, Prepared Hole: φ13.3, Form-Rolled Material: SCM440, Hardness of Form-Rolled Material: 30 HRC, Oil Agent: water-soluble, Number of Rotations (per Minute): 560

FIG. 4 depicts a test result acquired by screwing a thread forming tap into a prepared hole with a prepared hole depth of 13 mm until broken (in contact with the bottom) to examine the maximum torque until broken as a "breakage torque". A "safety rate" is a value acquired by dividing the breakage torque by an initial rolling torque, and the initial rolling torque is a torque when a female thread is normally machined in a prepared hole that is a through hole, and is set to 35.1 (N·m) in this test. At the end of normal lifetime when the wear of the male thread 30 makes a machined female thread out of the gauge, the rolling torque is 69.4 (N·m), which is 1.98 times larger than the initial rolling torque, and a minimum standard value of the safety rate is set to a slightly larger value of 2.3 for judgment of acceptance. In FIG. 4, the conventional product and the prototypes 1 to 3, 7, 8, 10, 11, 13, 17, and 18 in shaded test sample fields are NG products having a safety rate smaller than 2.3 unable to achieve sufficient breakage strength.

The NG products are also indicated by shaded test sample fields of FIG. 3 and, with regard to the total angle α, it is considered that a range from 60 degrees to 100 degrees is appropriate from the test results of the prototypes 1 to 7 and that a large load is applied and tends to cause damage to the rotation stop key 56 in the prototypes 1 to 3 with the angle smaller than 60 degrees since the tip 14 is damaged. It is considered that a large load is applied and tends to cause damage to the mounting screw 80 in the prototype 7 with the angle larger than 100 degrees since the mounting screw 80 is damaged. With regard to the radius RA, it is considered that a range from 1.5 mm to 2.8 mm is appropriate from the test results of the prototypes 8 to 12 and that stress is concentrated and tends to cause damage to the key groove 54 in the prototypes 8 and 10 with the radius smaller than 1.5 mm since the body 12 is damaged. It is considered that a thickness is reduced on the both sides of the key groove 54 and tends to cause damage in the prototype 11 with the radius larger than 2.8 mm since the body 12 is damaged. With regard to the radius RB (=RC), it is considered that a range from 1.5 mm to 2.8 mm is appropriate from the test results of the prototypes 13 to 17 and that stress is concentrated and tends to cause damage to the corners of the both base-end side portions of the rotation stop key 56 in the prototype 13 with the radius smaller than 1.5 mm since the tip 14 is damaged. It is considered that the torque transmission area (area of the contact portion between the side surface of the rotation stop key 56 and the side wall of the key groove 54) is reduced and tends to cause damage in the prototype 17 with the radius larger than 2.8 mm since the body 12 is damaged. With regard to the depth dimension L, it is considered that a dimension of 2.0 mm or more (≈0.14D) is appropriate from the test results of the prototypes 18 to 22 and that a width of the rotation stop key 56 is reduced and tends to cause damage due to strength shortage in the prototype 18 with the dimension smaller than 2.0 mm since the tip 14 is damaged. The depth dimension L greater than 5 mm is not usable in design since the key groove 54 protrudes from the body 12 or the rotation stop key 56 protrudes from the tip 14.

FIG. 5 depicts the case of preparing three test samples for each of four types depicted in (a) and conducting an endurance test by executing a female thread forming process under test conditions depicted in (b) and results depicted in (c) and (d) were acquired. A conventional product of (a) has a Y-shaped oil passage depicted in FIG. 11; a prototype 1 is disposed with an oil flow groove in the axial direction on the outer circumferential surface of the shank; a prototype 2 is formed as the thread forming tap 10 without the radial hole 92 and the gap 66 so that oil is supplied to the leading end side of the tip 14 only through the radial holes 94, 96, the gap 98, and the radial grooves 70; and a prototype 3 is the thread forming tap 10. With regard to a column of cause of life expiration, chipping includes the chipping of the screw thread of the male thread 30 due to welding and the breakage of the coupling portion of the body 12 and the tip 14. Wearing means the wearing of the screw thread of the male thread 30 and is determined by whether a machined female thread is out of the gauge.

FIG. 5(d) is a bar graph representative of the test results of (c) and all the prototypes 3, i.e., the inventive products, could machine a female thread until becoming unusable for machining due to wearing of the male thread 30 and achieved stable performance in terms of the number of form-rolled holes, which was 6800, while the conventional product and the prototype 1 reached the end of life because of chipping due to welding and had smaller and widely-varying numbers of form-rolled holes as compared to the prototypes 3. One of the prototypes 2 supplying oil only from the head portion could be used until becoming unusable for machining due to wearing of the male thread 30; however, the others became unusable because of chipping due to welding and were unable to achieve stable performance.

Second Example

Other examples of the present invention will be described. In the following examples, the portions substantially common to the examples are denoted by the same reference numerals and will not be described in detail.

Figure 6:
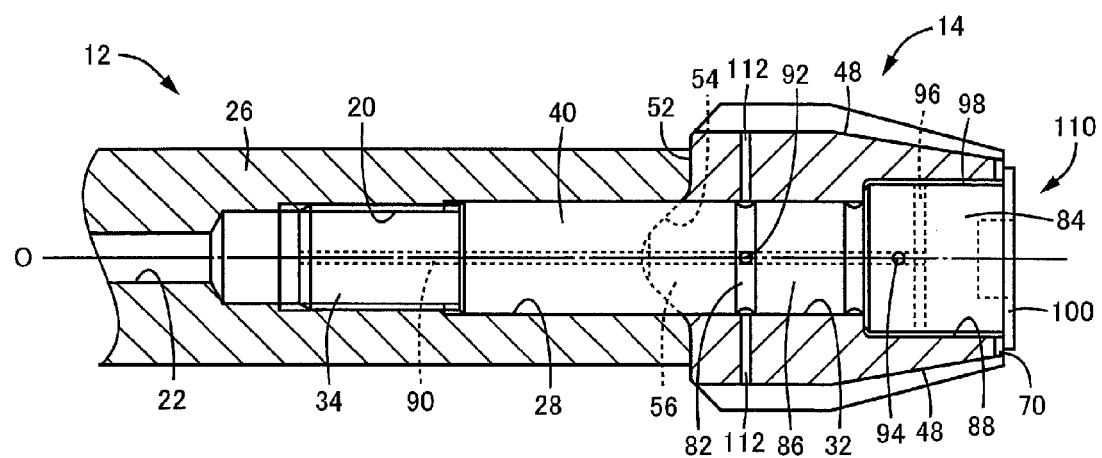
FIG. 6 is a diagram for explaining the other example of the present invention and a cross-sectional view corresponding to FIG. 1(b).

FIG. 6 is a cross-sectional view corresponding to FIG. 1(b) and has a difference in a mounting screw 110 as compared to the example described above. The mounting screw 110 is different in arrangement positions of the annular groove 82 and the radial hole 92 as compared to the mounting screw 80, and the annular groove 82 and the radial hole 92 are disposed in a base end portion of the tip 14, specifically, within a range of two pitches or less of the screw thread of the male thread 30 from the base end of the tip 14, i.e., from the opposing surface 52. A plurality of radial holes 112 are radially disposed in a penetrating manner from the mounting hole 32 to the outside in the base end portion of the tip 14 at a portion corresponding to the annular groove 82, and the lubrication oil agent guided from the fluid introduction path 90 through the radial hole 92 into the annular groove 82 is discharged from a plurality of the radial holes 112 to the outer circumferential side to lubricate the base end portion of the tip 14. In this example, the radial holes 112 are disposed corresponding to the plurality of the oil flow grooves 48 and the radial holes 112 are opened in the bottom portions of the oil flow grooves 48. The radial holes 112 make up the base end side discharge passage along with the radial hole 92 and the annular groove 82 disposed on the mounting screw 110.

In this example, since a plurality of the radial holes 112 are disposed within a range of two pitches or less from the base end side of the tip 14 and the radial holes 112 act as the base end side discharge passage, the lubrication oil agent is further properly supplied to the base end side portion of the tip 14 and good lubrication performance is acquired even at the time of backing when the tip 14 is reversely rotated and extracted from a female thread after machining of the female thread, and the breakage due to welding to a work is further properly suppressed.

Third Example

Figure 7:
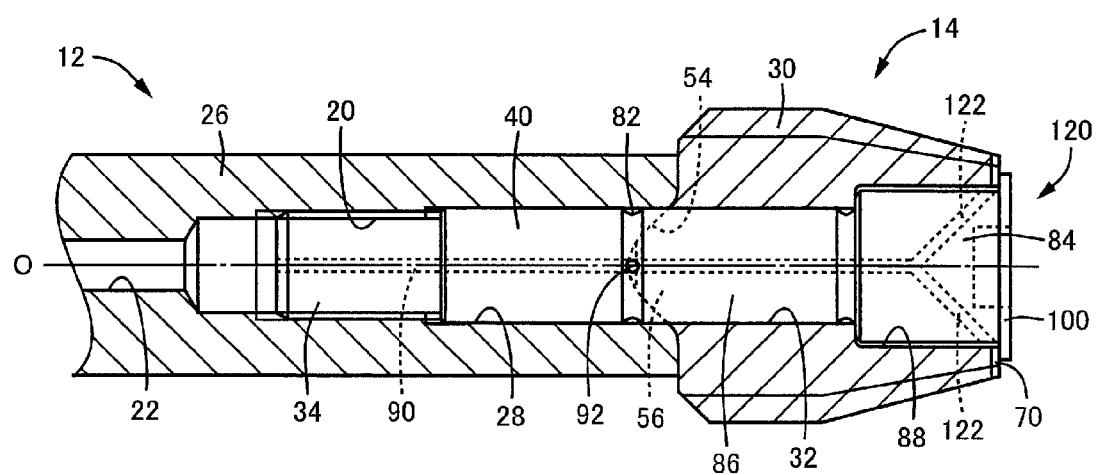
FIG. 7 is a diagram for explaining yet another example of the present invention and a cross-sectional view corresponding to FIG. 1(b).
Figure 8A:
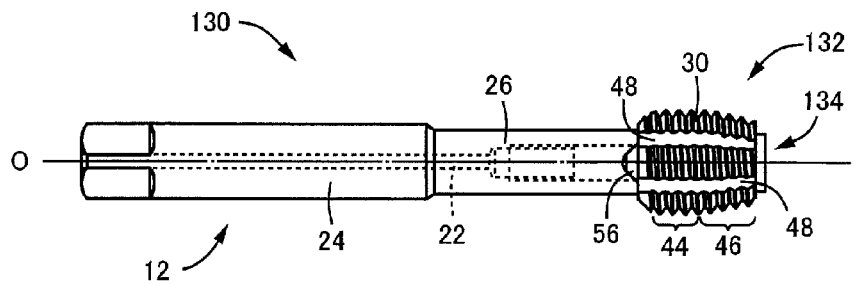
FIG. 8 is diagrams for explaining yet another example of the present invention; (a) is a front view from the direction orthogonal to the shaft center O; (b) is an enlarged cross-sectional view of a leading end portion including a tip; (c) is a cross-sectional view taken along a line VIIIC-VIIIC of (b); and (d) is an end surface view from the leading end side.
Figure 8B:
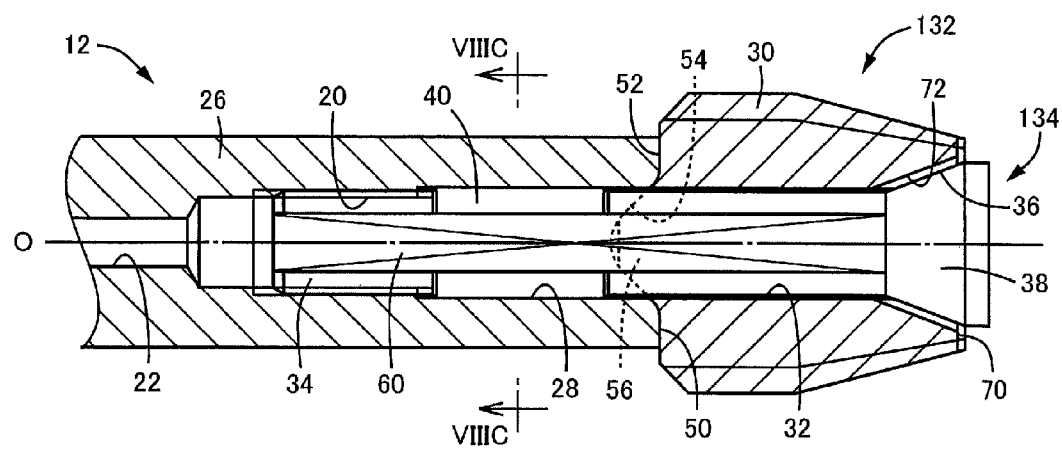
Figure 8C:
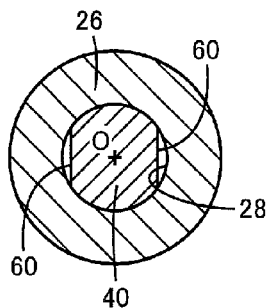
Figure 8D:
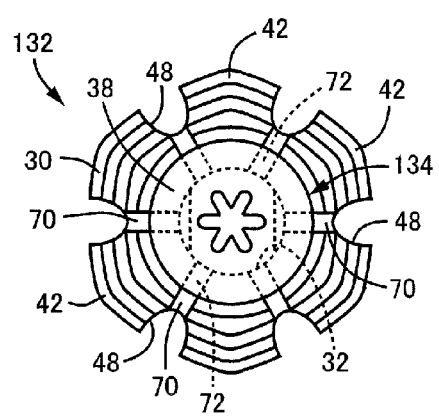

FIG. 7 is a cross-sectional view corresponding to FIG. 1(b) and has a difference in a mounting screw 120 as compared to the example of FIG. 1. In particular, the mounting screw 120 is disposed with inclined branch holes 122 branched into a Y shape toward the leading end side instead of disposing the radial holes 94 and 96, and the lubrication oil agent is guided from the fluid introduction path 90 to the opening edge of the housing hole 88 and is discharged by using the flange 100 from the plurality of the radial grooves 70 toward the outer circumferential side. The inclined branch holes 122 make up the leading end side discharge passage along with the radial grooves 70 and the number of the inclined branch holes 122 may be two or the six inclined branch holes 122 may be disposed corresponding to the radial grooves 70 and the oil flow grooves 48. The radial grooves 70 and the flange 100 may not be disposed so that the lubrication oil agent is directly discharged from the inclined branch holes 122 obliquely toward the outer circumferential side.

Fourth Example

Figure 2B:
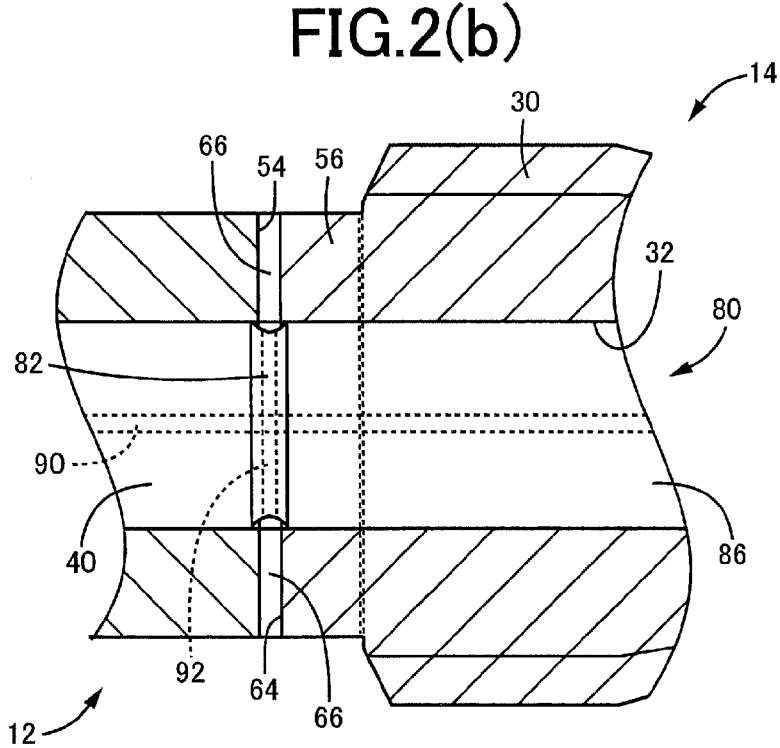
Figure 9:
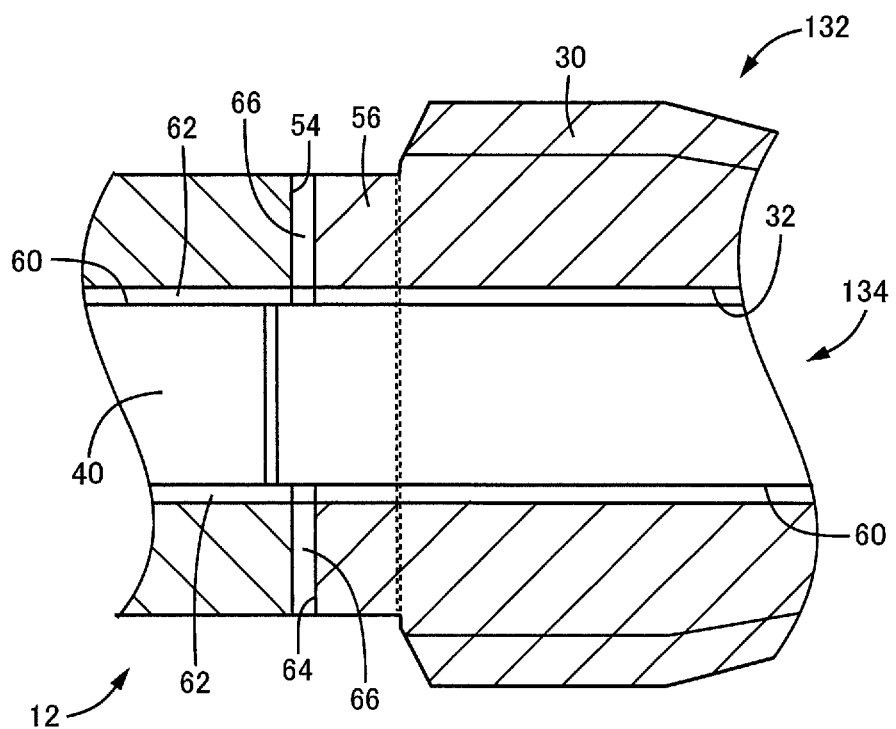
FIG. 9 is an enlarged view of a coupling portion of the tip and the body of a thread forming tap in FIG. 8 and cross-sectional view corresponding to FIG. 2(b).
Figure 10:
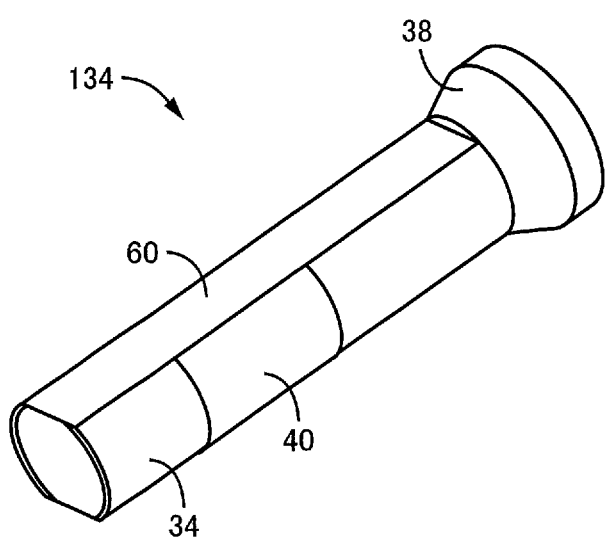
FIG. 10 is a perspective view of the mounting screw of the thread forming tap in FIG. 8.

FIGS. 8 to 10 are diagrams for explaining another example of the present invention; (a) of FIG. 8 is a front view from the direction orthogonal to the shaft center O; (b) is an enlarged cross-sectional view of a leading end portion including a tip 132; (c) is a cross-sectional view taken along a line of (b); and (d) is an end surface view from the leading end side of the tip 132. FIG. 9 is an enlarged cross-sectional view of a coupling portion of the tip 132 and the body 12 of a thread forming tap 130, corresponding to FIG. 2(b), and FIG. 10 is a perspective view of only an mounting screw 134 for attaching the tip 132 to the body 12 in a removable manner.

The mounting screw 134 of this example does not include the centering portion 86 and the body 12 and the mounting screw 134 are concentrically centered by fitting the centering portion 40 into the centering hole 28 of the body 12. While a taper-shaped housing hole 36 having a diameter increasing toward an opening end is disposed in an opening portion on the leading end side of the mounting hole 32 disposed in the tip 132, the mounting screw 134 includes a head portion 38 having the same taper angle, and the head portion 38 is housed in and brought into close contact with the housing hole 36, thereby concentrically centering the mounting screw 134 and the tip 132. As a result, the body 12 and the tip 132 are concentrically centered via the mounting screw 134.

The mounting screw 134 has a pair of the flat chamfers 60 disposed in parallel with the shaft center across the full length of a shaft portion including the leading end thread portion 34 and the centering portion 40 at symmetrical positions relative to the shaft center, and the flat chamfers 60 allow gaps formed with the inner circumferential surfaces of the female thread 20, the centering hole 28, and the mounting hole 32 to act as a fluid introduction path 62 (see FIG. 9) and the lubrication oil agent supplied from the fluid supply path 22 into the stepped hole disposed with the female thread 20 etc., is guided via the fluid introduction path 62 to the leading end portion of the tip 132. A portion of the lubrication oil agent guided through the fluid introduction path 62 to the base end portion of the tip 132 is discharged in two directions orthogonal to the shaft center O and opposite to each other from the gap 66 between the rotation stop key 56 and the key groove 54.

On the other hand, a leading end surface of the tip 132 has a plurality of the radial grooves 70 radially disposed continuously from the opening portion of the housing hole 36 to the outer circumferential edge, and an inner wall surface (taper surface) of the housing hole 36 has a plurality of axial grooves 72 disposed in communication with the radial grooves 70 so that the lubrication oil agent introduced through the fluid introduction path 62 to the leading end portion of the tip 132 is discharged through the axial grooves 72 and the radial grooves 70 from the leading end of the tip 132 toward the outer circumferential side. The axial grooves 72 correspond to the axial passage and the leading end side discharge passage is made up of the axial grooves 72 and the radial grooves 70. In this example, the flange same as the flange 100 can also be disposed on the head portion 38 of the mounting screw 134 such that the lubrication oil agent is discharged in the direction substantially orthogonal to the shaft center O.

Since the removable tip type thread forming tap 130 as described above has a pair of the flat chamfers 60 disposed on the shaft portion of the mounting screw 134, the fluid introduction path 62 is formed with the inner circumferential surfaces of the stepped hole disposed with the female thread 20 etc., and the mounting hole 32 of the tip 132 so that the lubrication oil agent supplied from the fluid supply path 22 into the stepped hole disposed with the female thread 20 etc., is guided to the leading end portion of the tip 132 while the lubrication oil agent is discharged to the outer circumferential side from both the base end side discharge passage (the gap 66) disposed on the base end side of the tip 132 and the leading end side discharge passage (the axial grooves 72 and the radial grooves 70) disposed in the leading end side of the tip 132. Therefore, the lubrication oil agent is sufficiently supplied to a portion of the female thread forming process by the tip 132 and the breakage strength is further improved in combination with the rotation stop structure of the rotation stop key 56 and the key groove 54 such that the same effect as the example is acquired.

Although the examples of the present invention have been described in detail with reference to the drawings, these examples are merely an embodiment and the present invention may be implemented in variously modified and improved forms based on the knowledge of those skilled in the art.

NOMENCLATURE OF ELEMENTS 10, 130: removable tip type thread forming tap (removable tip type rotary tool) 12: body 14, 132: tip 16, 80, 110, 120, 134: mounting screw 20: female thread (screw hole) 22: fluid supply path 32: mounting hole 36, 88: housing hole 38, 84: head portion 50, 52: opposing surface 54: key groove 56: rotation stop key 62, 90: fluid introduction path 64: retraction surface 66: gap (base end side discharge passage) 70: radial groove (leading end side discharge passage) 72: axial groove (axial passage, leading end side discharge passage) 92: radial hole (base end side discharge passage) 94, 96: radial hole (leading end side discharge passage) 98: gap (axial passage, leading end side discharge passage) 112: radial hole (base end side discharge passage) 122: inclined branch hole (leading end side discharge passage) 0: shaft center of body

The invention claimed is:

1. A removable tip type rotary tool comprising:
a body forming a shaft shape, the body having a screw hole disposed concentrically with a shaft center and a fluid supply path disposed in communication with the screw hole;
a tip concentrically attached to a leading end portion of the body in a removable manner, the tip being rotationally driven around the shaft center along with the body for predetermined processing, the tip being disposed with a mounting hole penetrating through the shaft center of the tip; and
a mounting screw penetrating the mounting hole of the tip and screwed into the screw hole of the body to integrally fix the tip to the body, the removable tip type rotary tool being configured to dispose one and the other of opposing surfaces of the body and the tip are disposed with a rotation stop key and a key groove each having a triangular shape with a cross section symmetric relative to the shaft center in the direction orthogonal to the shaft center, fastening by the mounting screw bringing a pair of side surfaces of the rotation stop key and a pair of side walls of the key groove into close surface contact with each other,
a total angle α for each of the pair of the side surfaces of the rotation stop key and the pair of the side walls of the key groove is within a range from 60 degrees to 100 degrees, a groove bottom of the key groove is rounded with a radius RA within a range from 1.5 mm to 2.8 mm, corners of opening edges on both sides of the key groove and corners of both base-end side portions of the rotation stop key being rounded with radiuses RB and RC, respectively, within a range from 1.5 mm to 2.8 mm,
the removable tip type rotary tool being configured to be disposed with a fluid introduction path guiding fluid supplied from the fluid supply path into the screw hole toward the tip, and to have a leading end side discharge passage discharging the fluid to an outer circumferential side from a leading end side relative to a center of the tip in axial direction and a base end side discharge passage discharging the fluid to the outer circumferential side from a base end side relative to the center,
the rotation stop key being configured to be disposed on the opposing surface of the tip, the rotation stop key having a leading end disposed with a retraction surface away from a bottom portion of the key groove, and a gap between the retraction surface and the key groove acts as the base end side discharge passage.

2. The removable tip type rotary tool of claim 1, wherein a gap dimension between the retraction surface and the bottom portion of the key groove is within a range from 0.2 mm to 0.5 mm.

3. The removable tip type rotary tool of claim 1, wherein a housing hole housing a head portion of the mounting screw is disposed in a leading end surface of the tip, wherein a radial groove is disposed continuously from an opening portion of the housing hole to an outer circumferential edge, wherein an axial passage is disposed between an inner wall surface of the housing hole and an outer circumferential surface of the head portion in communication with the radial groove, and wherein the axial passage and the radial groove act as the leading end side discharge passage.

4. The removable tip type rotary tool of claim 1, wherein both the rotation stop key and the key groove are formed into a predetermined cross-sectional shape by wire cut discharge machining.

* * * * *